(12) United States Patent
Guturu et al.

(10) Patent No.: US 6,581,075 B1
(45) Date of Patent: Jun. 17, 2003

(54) SYSTEM AND METHOD FOR DATABASE SYNCHRONIZATION

(75) Inventors: Parthasarathy Guturu, Richardson, TX (US); Jatinder Pal, Fairport, NY (US); Thomas E. Heaven, Manotick (CA); Zhengya Zhu, Kanata (CA); William J. Jordan, Nepean (CA); Helmut Beffert, Chelsea (CA); Ray McNamara, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 209 days.

(21) Appl. No.: 09/752,838

(22) Filed: Dec. 28, 2000

(51) Int. Cl.[7] ............................................. G06F 17/30
(52) U.S. Cl. ........................... 707/201; 707/8; 707/10; 707/104.1
(58) Field of Search ........................... 707/8, 10, 104.1, 707/201

(56) References Cited

U.S. PATENT DOCUMENTS

| | | | |
|---|---|---|---|
| 6,178,172 B1 | * 1/2001 | Rochberger | 370/395 |
| 6,223,149 B1 | * 4/2001 | Margulis et al. | 703/27 |
| 6,493,725 B1 | * 12/2002 | Iwai et al. | 707/200 |
| 2002/0052876 A1 | * 5/2002 | Waters | 707/100 |

FOREIGN PATENT DOCUMENTS

EP    0 959 417 A2  * 11/1999  ........... G06F/17/30

OTHER PUBLICATIONS

Tao et al., Updates Management in Enterprises Databases, IEEE, pp. 2466–2471.*

* cited by examiner

*Primary Examiner*—Frantz Coby
(74) *Attorney, Agent, or Firm*—Wei Wei Jeang; Munsch Hardt Kopf & Harr, P.C.

(57) ABSTRACT

A method of maintaining synchronization among multiple databases is provided. The method includes the steps of receiving a data update request for a data record at a database, and comparing a timestamp of the data record to a timestamp of the data update request. The data in the data record is updated with the data update request if the timestamp of the data update request is substantially greater than the timestamp of the data record. Otherwise, the data in the data record is updated with the data update request if the operational priority of the data update request is higher than the operational priority of the data record. Alternatively, the data in the data record is updated with the data update request if the node priority of the data update request is higher than the node priority of the data record.

45 Claims, 7 Drawing Sheets

SYSTEM AND METHOD FOR DATABASE SYNCHRONIZATION

TECHNICAL FIELD OF THE INVENTION

This invention relates to networks, and more particularly, to a system and method for database synchronization.

BACKGROUND OF THE INVENTION

In many applications, two or more redundant databases storing the same data are maintained to ensure system fault-tolerance and reliability. In particular, in telecommunication networks, redundant service control point (SCP) databases for storing customer data and telephony service data are maintained. These redundant databases are required to store identical copies of the data and therefore must be synchronized.

Because SCP update data can originate from the service management system (SMS) or other network nodes in the Signalling System No. 7 (SS7) network and propagated to all the SCPs, conflicts may result. For example, an update on a particular data record may originate from the SMS and a second update on the same data record may originate from the SS7 network. Both update requests may arrive at one SCP in one sequential order and at a second SCP in another sequential order. The result may be non-identical data in the two SCPs. In another scenario, the transmission of a data update request of a particular data record to a SCP may be delayed by a temporarily downed link. As a result, a second data update request for the same data record may arrive at the same SCP ahead of the earlier data update request. This may produce a data record at this SCP different from those at other SCPs.

A conventional method of preventing conflicts is to mandate a synchronous update paradigm where new data updates are processed only when a previous data update is processed, propagated to all SCPs, and confirmed. Such synchronous schemes require an exchange of a large number of protocol messages. The transmission and processing of these messages results in network bandwidth utilization inefficiencies and adversely impacts real-time performance. In addition, many conventional conflict resolution methods resolve the conflict problem in case of replacement updates, but not conflicts arising from insertion and deletion update operations originating from multiple sources.

SUMMARY OF THE INVENTION

It may be seen from the foregoing that there is a need for a method to process conflicting data update requests without the use of synchronizing messages in a synchronous update paradigm. The solution should be capable of processing data update messages arriving out of order and originating from multiple sources.

In accordance with an embodiment of the present invention, a method of maintaining synchronization among multiple databases is provided. The method includes the steps of receiving a data update request for a data record at a database, and comparing a timestamp of the data record to a timestamp of the data update request. The data in the data record is updated with the data update request if the timestamp of the data update request is substantially greater than the timestamp of the data record. Otherwise, the data in the data record is updated with the data update request if the operational priority of the data update request is higher than the operational priority of the data record. Alternatively, the data in the data record is updated with the data update request if the node priority of the data update request is higher than the node priority of the data record.

In accordance with another embodiment of the present invention, a method of processing data update requests originating from multiple sources at a database is provided. The method includes the steps of receiving a data update request for a data record at the database, and comparing a timestamp of the data record to a timestamp of the data update request. The method then updates the data in the data record with the data update request if the timestamp of the data update request is a predetermined conflict time window later than the timestamp of the data record. The operational priority of the data record is then compared to the operational priority of the data update request if the timestamp of the data update request is substantially identical to the timestamp of the data record, and the data in the data record is updated with the data update request if the operational priority of the data update request is higher than the operational priority of the data record. The method then compares the node priority of the data record to the node priority of the data update request if the timestamp of the data update request is substantially identical to the timestamp of the data record, and the operational priority of the data update request is substantially identical to the operational priority of the data record. The data in the data record is then updated with the data update request if the node priority of the data update request is higher than the node priority of the data record. Otherwise, the data update request is ignored in response to the timestamp of the data update request being substantially identical to the timestamp of the data record, the operational priority of the data update request being substantially identical to the operational priority of the data record, and the node priority of the data update request being substantially identical to the node priority of the data record.

In accordance with yet another embodiment of the present invention, a method of handling data update requests for a database includes the steps of receiving a data update request for a data record in the database, comparing a version number of the data record to a version number of the data update request, and resolving update conflict if the version number of the data update request is less than or equal to that of the data record. The timestamp of the data record is first compared to the timestamp of the data update request. If the timestamp of the data update request is a predetermined conflict time window later than the timestamp of the data record, the data in the data record is updated with the data update request. If the timestamp of the data update request is substantially identical to the timestamp of the data record, the operational priority of the data record is compared with the operational priority of the data update request. The data in the data record is then with the data update request if the operational priority of the data update request is higher than the operational priority of the data record. The method compares the node priority of the data record to the node priority of the data update request if the timestamp of the data update request is substantially identical to the timestamp of the data record and the operational priority of the data update request is substantially identical to the operational priority of the data record. The data in the data record is updated with the data update request if the node priority of the data update request is higher than the node priority of the data record. Otherwise, the data update request is ignored if the timestamp of the data update request is substantially identical to the timestamp of the data record, the operational priority of the data update request is substantially identical to the operational priority of the data record, and the node priority of the data update request is substantially identical to the node priority of the data record.

A technical advantage of the present invention is achieving database synchronicity without the use of synchronizing messages and thus avoiding high traffic on the links between the databases. Furthermore, even if data update requests arrives at the databases out of the correct order or in a different order than at another database, the present invention is operable to process the data update requests and maintain the same data content at the two databases. dr

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 9 of the drawings, like numerals being used for like and corresponding parts of the various drawings.

Figure 1:
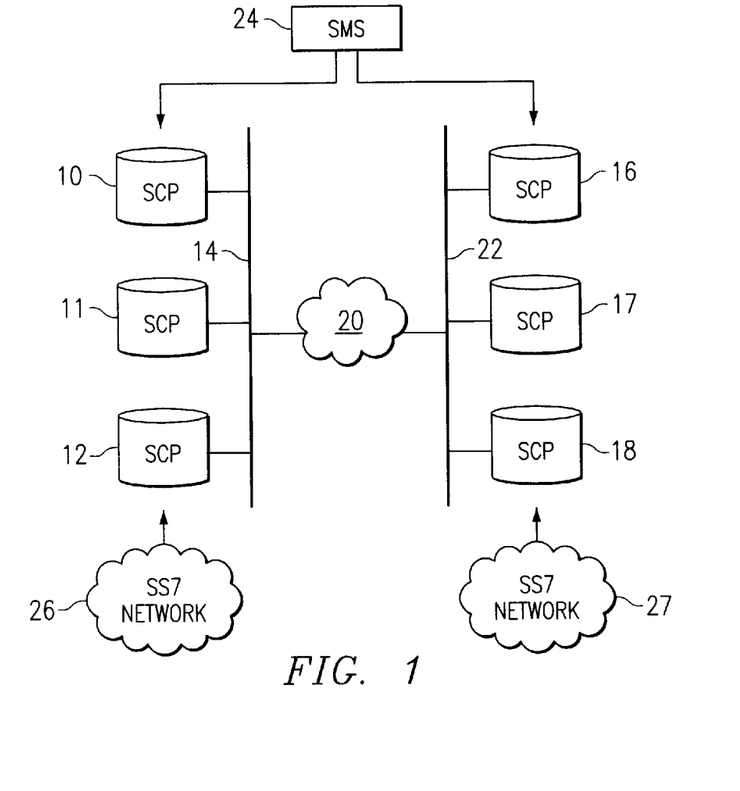
FIG. 1 is a simplified block diagram of a network of redundant service control point (SCP) nodes.

FIG. 1 is a simplified block diagram of a network of redundant service control point (SCP) nodes. A first set of SCPs 10–12 are interconnected by a network such as a local area network (LAN) 14, and a second set of SCPs 16–18 are interconnected by a second network 22. SCPs 10–12 may be co-located within a second fixed premises remotely located from the first. The two sets of SCPs are further coupled together via a long distance network, such as a wide area network (WAN) 20. Any currently known or future networking technology and protocol may be used in the LANs and the WAN to deliver and transmit control messages and data.

Figure 8:
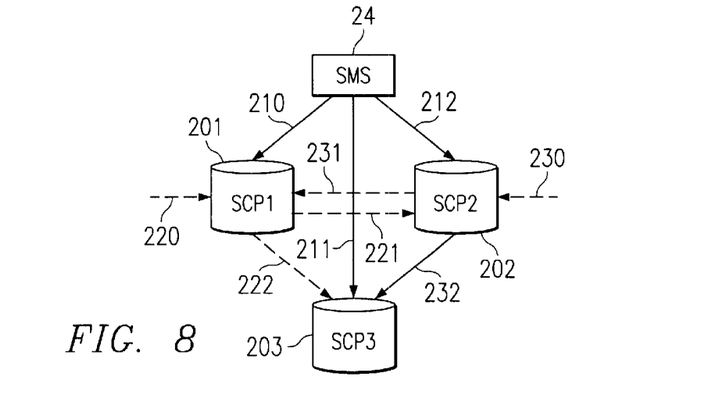
FIG. 8 is a simplified block diagram showing the numerous data update paths between the SMS and SCPs.

There are at least two sources of data updates: the service management system (SMS) 24 and the Signaling System 7 (SS7) networks 26 and 27. FIG. 8 is a simplified block diagram showing the numerous data update paths between the SMS and SCPs. Updates originating in the SMS 24 are typically service provisioning updates. Updates originating in the SS7 networks are typically relate to changes or modifications of customer data. SMS-originated updates or SMS updates are propagated to all the SCPs 201–202, shown as paths 210–212 in FIG. 8. SS7 network updates or a network side updates (NSU) are performed at a particular SCP, for example SCP1 201, and then propagated to all other SCPs 202 and 203 via paths 221 and 222, or to SCP2 230 and then propagated to SCPs 201 and 203 via paths 231 and 232.

Figure 2:
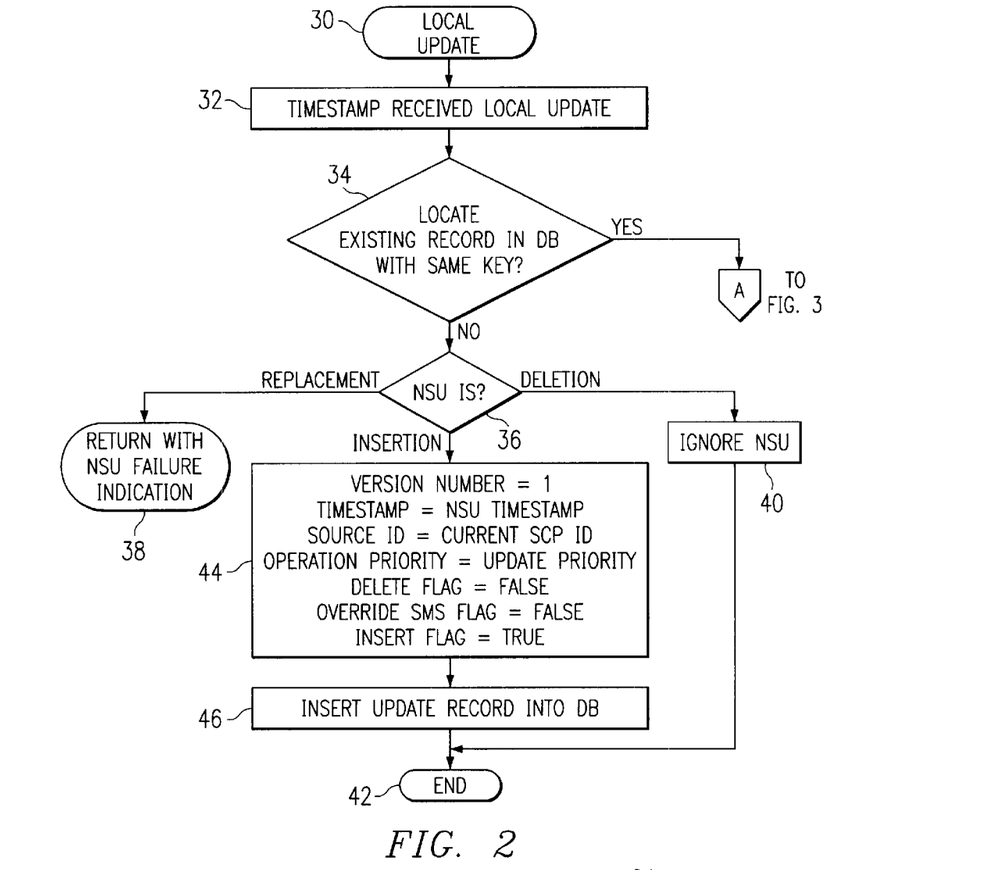
FIGS. 2 and 3 are flowcharts of an embodiment of a local update process according to the teachings of the present invention.
Figure 3:
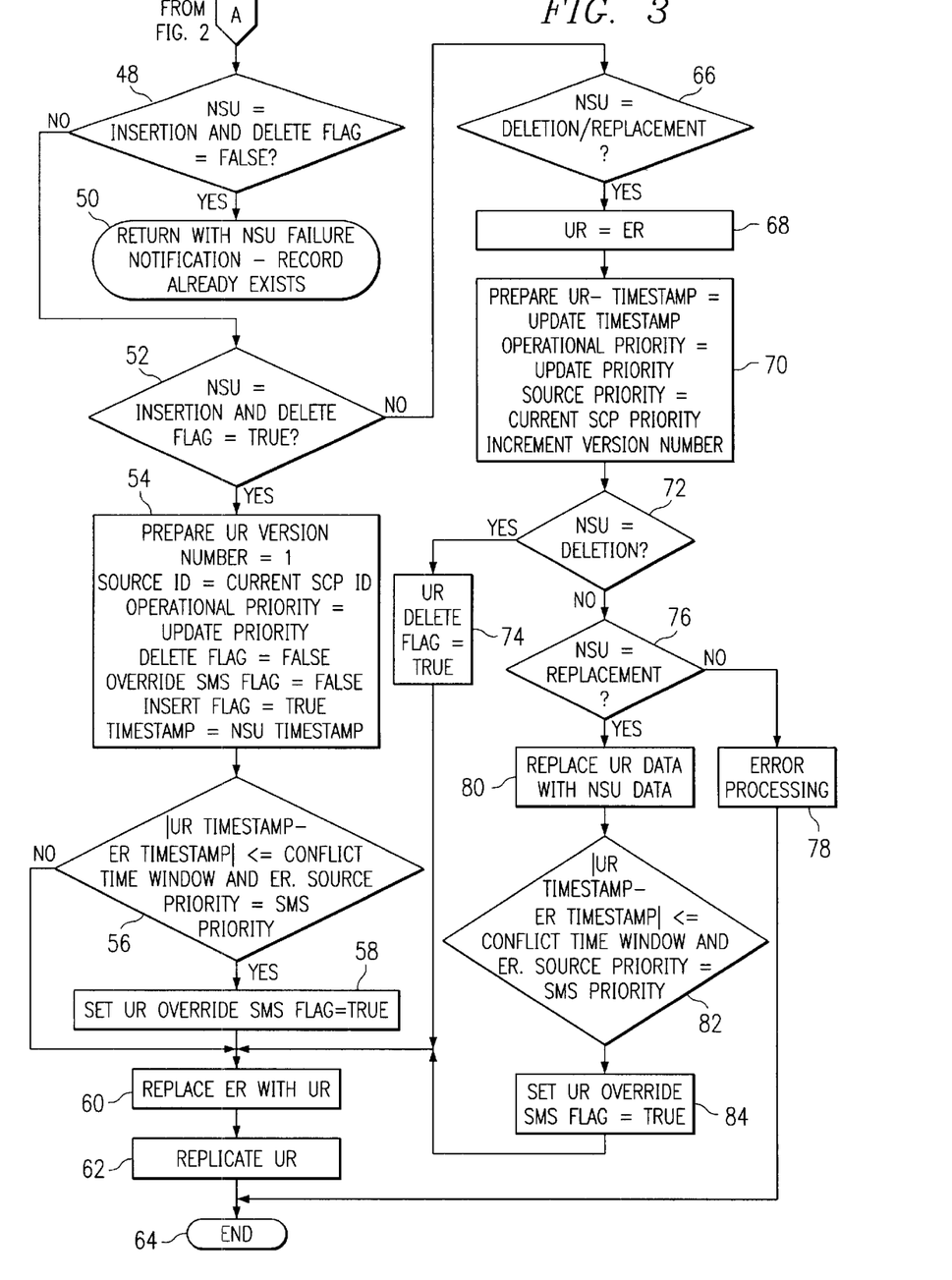
Figure 9:
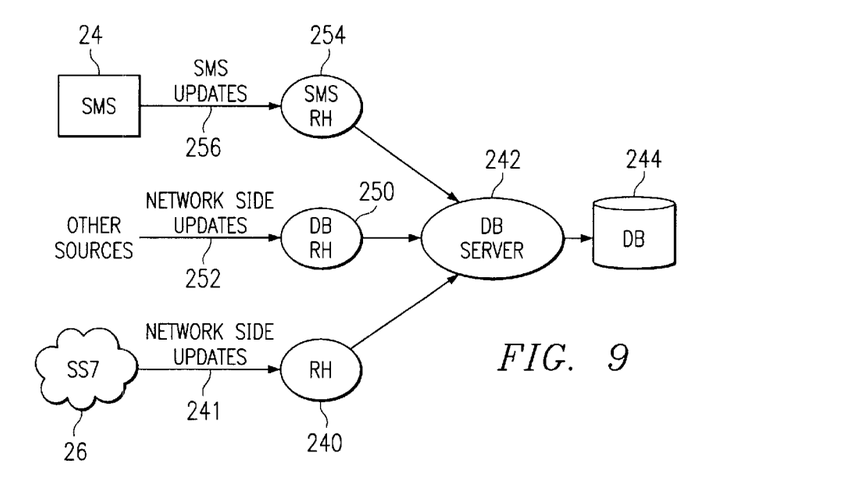
FIG. 9 is a simplified block diagram showing more details of a SCP according to the teachings of the present invention.

FIGS. 2 and 3 are flowcharts of an embodiment of a local update process 30 according to the teachings of the present invention. A local request is one that is received from a request handler (RH) 240 and originates at the local SCP, such as shown in FIG. 9. Request handler 240 receives network side updates (NSUs) 241 from the SS7 network 26, processes the request by resolving any conflicts, and instructs database (DB) server 242 to modify the data in database 244. Database request handler 250 receives network side update requests 252 from other network sources and processes them in a similar manner. SMS request handler 254, on the other hand, receives SMS updates 256 from SMS 24, which are typically service provisioning data, such as adding a customer with a particular set of services. In block 32, local update requests received by the request handler are timestamped. Then, using the key or index value contained in the local update request, the database is searched to determine whether a record exists with the same index value, as shown in block 34. The existing data record is read from the database into a temporary buffer and the change in data is made to data in the buffer. The timestamp, version number, SCP identifier are then updated in the buffered data to reflect that of the update request. The data record in the buffer is then used to replace or update the data record in the database. The data record is then propagated to or replicated at other SCP nodes in the network. If on the other hand, the data record containing the same key does not exist, then the request is processed depending on what type of operation is being requested, as determined in block 36. If the network side update is a replacement type operation, in other words, an updated record is to replace an existing record, then a failure indicator is returned, as shown in block 38. The process ends or returns in block 42.

If the network side update is an insertion operation, then in block 44 the update version number of the updated record is set to 1, the timestamp of the updated record is set to equal to the timestamp of the network side update, and the source identifier is set to the identifier of the SCP. Further, a number of flags used for conflict resolution are also configured. An operational priority flag of the updated record is set equal to the update priority value. A delete flag of the updated record is set to false. The delete flag is used to indicate whether a record is to be deleted by a background deleter; if the delete flag is true, the record will be deleted. A set delete flag of a record can be reset by an SMS update with an earlier timestamp so that the record will not be deleted by the background deleter. The override SMS flag is also set to false. The override SMS flag is used to override the default priority of SMS updates. The updated data record is then inserted into the database, as shown in block 46. The process ends in block 42. On the other hand, if the network side update is of the deletion type, then the update is ignored with no activity, as shown in block 40. The process ends in block 42.

If in block 34 the existing record having the same key is located, then the type of the network side update is checked to determine if it is insertion, and whether the delete flag is false, as shown in block 48. If so, an update failure notification is returned with an indication that the record already exists, as shown in block 50. Otherwise, if it is determined in block 52 that the update is insertion and the delete flag is true, the updated record is prepared as shown in block 54. The version number is set to 1, the source identifier is set to the current SCP identifier, the operational priority is set to the operational priority of the update, the delete flag is set to false, the override SMS flag is set to false, the insert flag is set to true, and the timestamp is set to the timestamp of the network side update request.

If it is determined in block 56 that the difference between updated timestamp and the existing record timestamp is less than a predetermined conflict time window, in other words, the timestamps are close in time or substantially identical, then the override SMS flag of the updated record is set to true to allow a SMS update to be overwritten, as shown in block 58. If the conditions in block 56 are not true, then step 58 is skipped. The existing record is then replaced with the updated record, as shown in block 60. The update record is then replicated for propagation to other SCPs, as shown in block 62. The process ends or returns in block 64.

If in block 52 it is determined that the network side update is not an insertion or the delete flag is false, then if the update is a deletion or replacement, then the existing record is copied as the updated record, as shown in block 66. The updated record is further prepared by setting its timestamp to equal to the timestamp of the update request, the operational priority to the priority of the update request, the source priority to the current SCP priority, and incrementing its version number, as shown in block 70. In block 72, a determination is made as to whether the network side update is a deletion. If it is a deletion type of update, then the updated record delete flag is also set to true, as shown in block 74. Thereafter, the existing record is replaced by the updated record and the updated record is replicated for propagation, as shown in blocks 60–64.

If the network side update is not a deletion or a replacement, as determined in blocks 72 and 76, then an error has been detected and error processing is performed in block 78. If the update type is replacement, then the updated record data is replaced with the data in the network update request, as shown in block 80. Further, the difference between the timestamp of the updated record and the existing record is compared to the conflict time window in block 82. Also in block 82, the existing record source priority is compared with the SMS priority. If the timestamp difference is less than or equal to the conflict time window and the source priorities are equal, then the override SMS flag of the updated record is set to true in block 84, and execution proceeds to blocks 60–64. Otherwise, execution proceeds directly to blocks 60–64.

Figure 4:
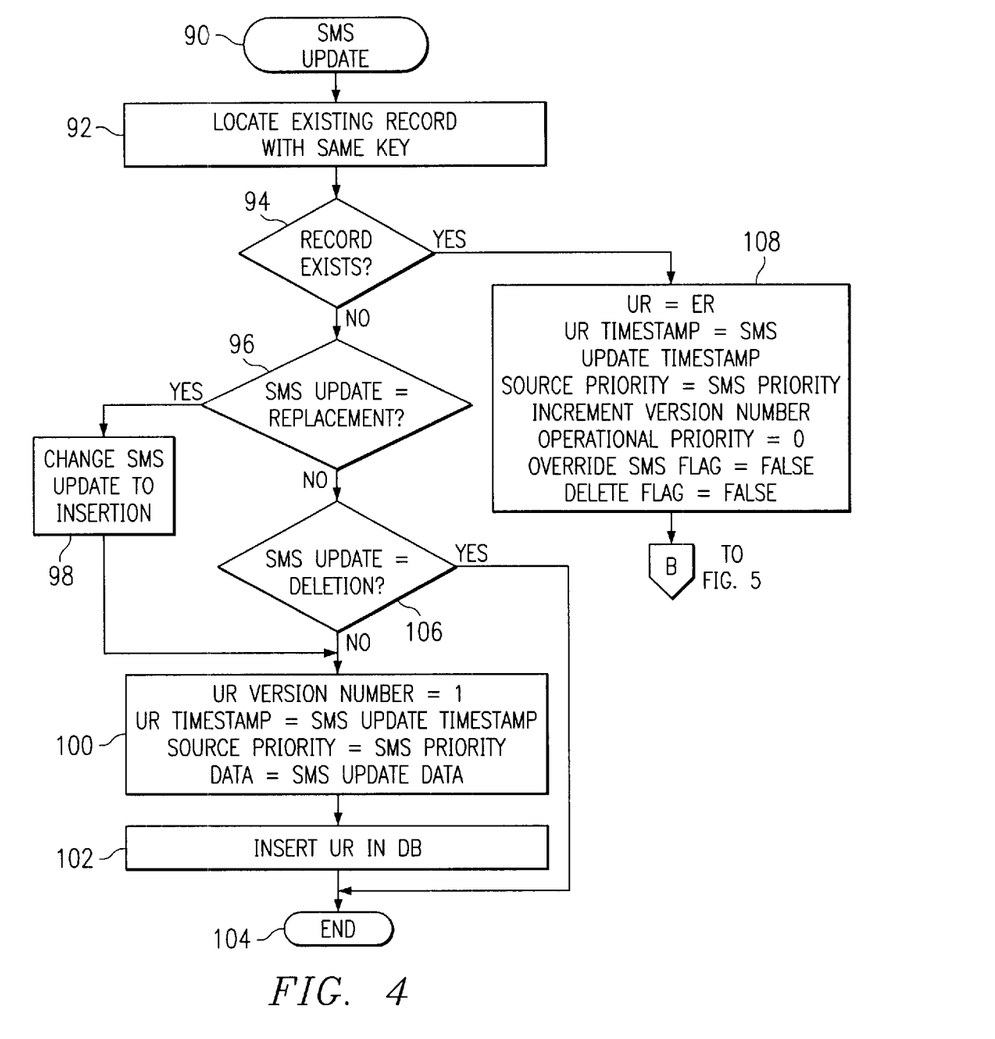
FIGS. 4, 5A and 5B are flowcharts of an embodiment of a service management system (SMS) update process according to the teachings of the present invention.
Figure 5A:
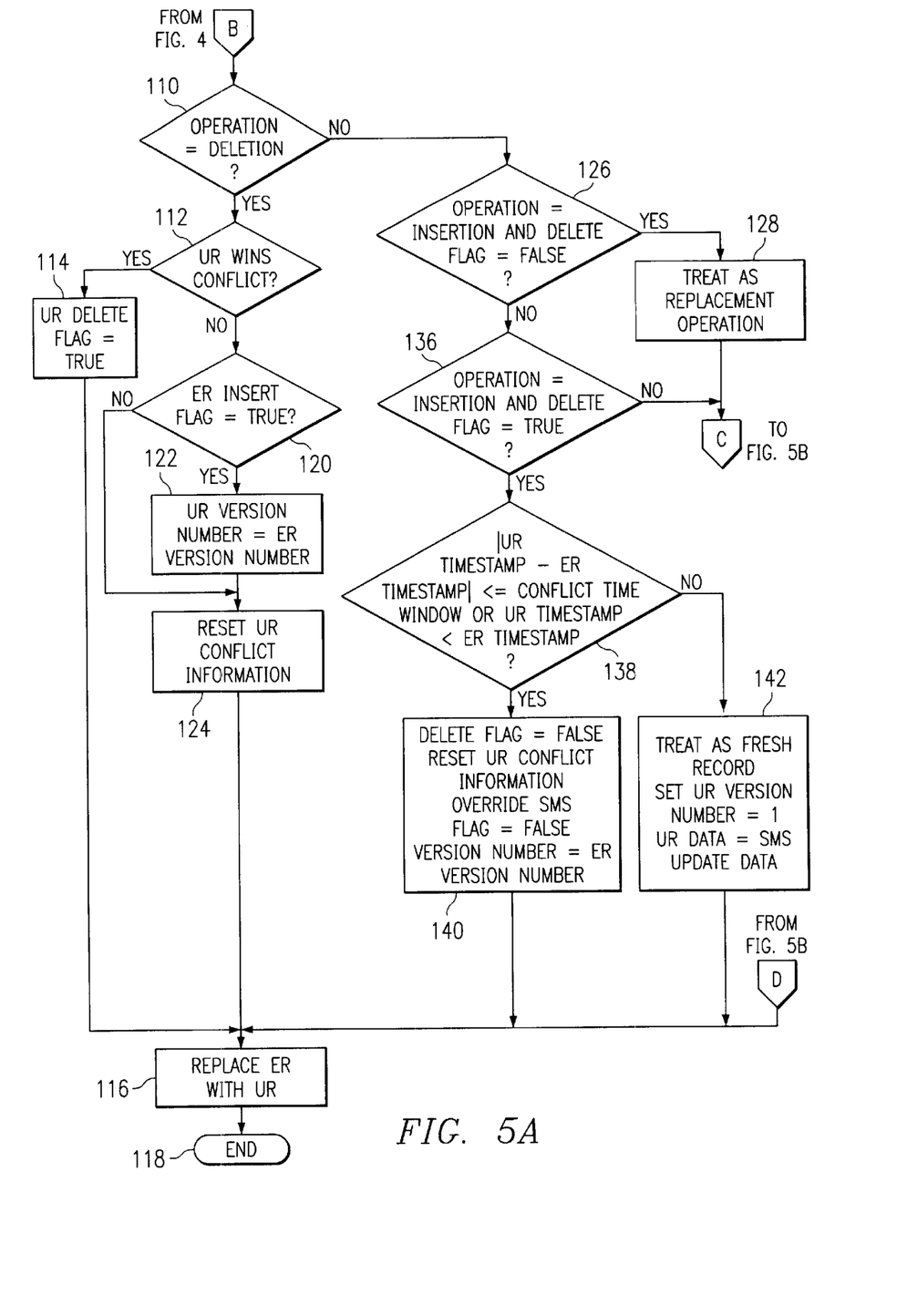
Figure 5B:
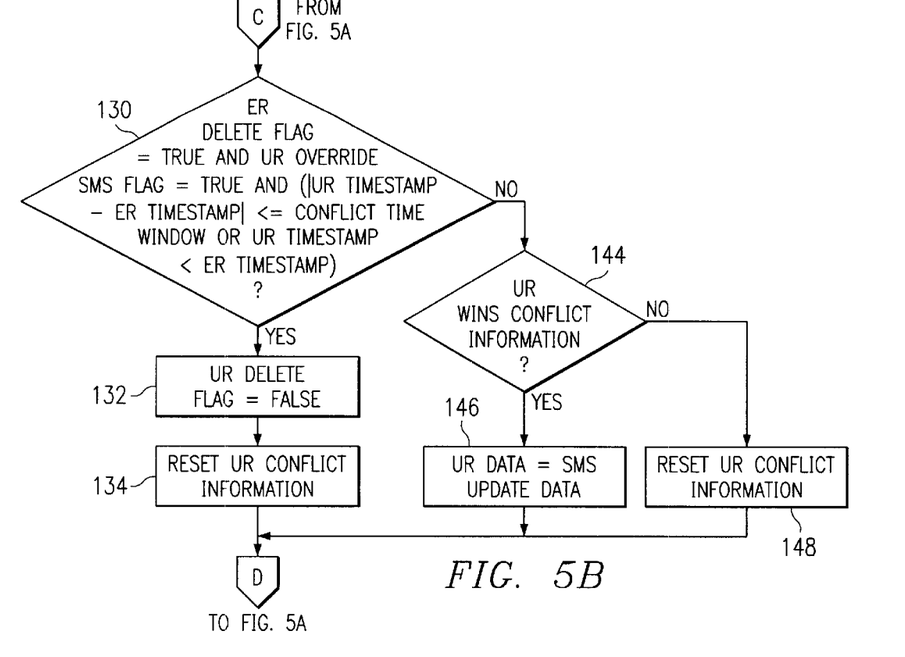

FIGS. 4, 5A and 5B are flowcharts of an embodiment of a service management system (SMS) update process 90 according to the teachings of the present invention. In block 92, the existing record with the same key is located in the database. If the record does not exist, as determined in block 94, then a determination is made as to whether the SMS update is a replacement in block 96. If it is not a replacement, then a determination of whether it is a deletion is determined in block 106. If it is a deletion, then the process ends with some error processing performed in block 104. If the update type is replacement, then the SMS update is changed to an insertion type of update, as shown in block 98. Thereafter, the version number of the updated record is set to 1, the timestamp of the updated record is set to the SMS update timestamp, the source priority is set to the SMS priority, and the SMS update data is copied to the updated record data, as shown in block 100. The updated record is then inserted into the database, as shown in block 102.

If in block 94 it is determined that the record does exist, then the existing record is the updated record, and the timestamp and source priority is set to that of the SMS update. Further, the version number is incremented, the operational priority is set to 0, and the override SMS and delete flags are set to false, as shown in block 108. If the update type is deletion, as determined in block 110, then the results of an updated record wins conflict process is determined, as shown in block 112. The updated record wins conflict process 162 is shown in FIG. 7.

Figure 7:
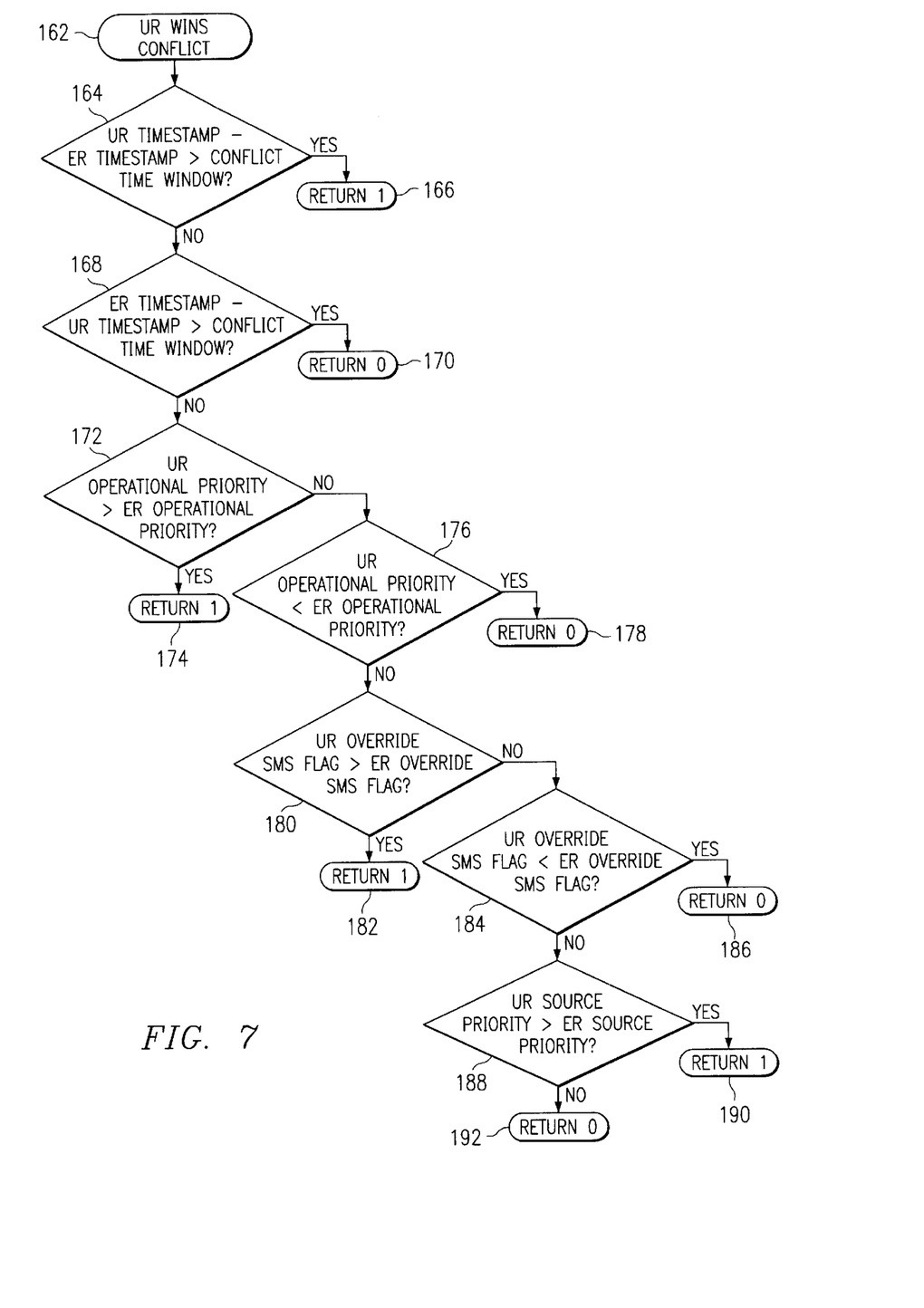
FIG. 7 is a flowchart of an embodiment of a UR (updated record) wins conflict process according to the teachings of the present invention.

In block 164 in FIG. 7, the updated record timestamp is compared to the existing record timestamp. If the difference is greater than the predetermined conflict time window, then a 1 or true is returned in block 166 to the determination made in block 112 of FIG. 5A. Otherwise, if the existing record timestamp is a conflict time window more than the updated record timestamp, as determined in block 168, then a 0 or false is returned, as shown in block 170. Otherwise in block 172, the updated record operational priority is compared to that of the existing record. If the updated record operational priority is greater, then a 1 or true is returned in block 174. Otherwise, if the updated record operational priority is less than the existing record operational priority, as determined in block 176, then a zero or false is returned in block 178. Otherwise, if the updated record override SMS flag is true and that of the existing record is false, as determined in block 180, then a 1 or true is returned in block 182. Otherwise, if the SMS override flag of the updated record is less than that of the existing record (indicating the updated record flag is true and the other is false), as determined in block 184, then a 0 or false is returned. Finally, in block 188, a determination is made as to whether the updated record source priority is greater than the existing source priority. If true, then a 1 or true is returned in block 190; otherwise, a 0 or false is returned in block 192.

Returning to block 112, if the returned value is true, then the delete flag of the updated record is set to true in block 114, and the existing record is replaced with the updated record in block 116. The process then ends in block 118. If the returned value in block 112 were false, then the existing record insert flag is checked to determine if it is true or false in block 120. It is false, then the reset updated record conflict information process 150 is executed, as shown in block 124. The reset updated record conflict information process 150 is shown in FIG. 6.

Figure 6:
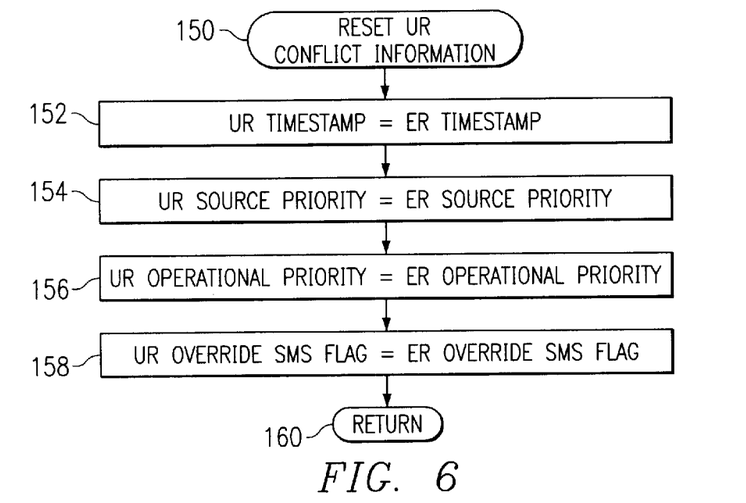
FIG. 6 is a flowchart of an embodiment of a reset conflict info process according to the teachings of the present invention.

Referring to FIG. 6, the updated record timestamp is set to the existing record timestamp, as shown in block 152. In block 154, the updated record priority is set to the existing record source priority. The updated record operational priority is also set to the existing record operational priority, as shown in block 156. The override SMS flag of the updated record is also reset to the existing record flag value, as shown in block 158. The process ends in block 160.

Thereafter returning to block 116, the existing record is replaced with the updated record, and the process ends in block 118. If in block 120 it is determined that the existing record insert flag is true, then the version number of the updated record is set to the existing record version number, as shown in block 122. The execution then proceeds to block 124.

If in block 110 it is determined that the update operation is not a deletion, then the operation type is checked to determine if it is insertion, and whether the delete flag is false, as shown in block 126. If the condition tested in block 126 is true, then the operation is treated as a replacement operation, as shown in block 128, and proceeds to block 130. Similarly, if the condition in block 126 were false, and the operation is not insertion or the delete flag is not true, as shown in block 136, then execution also proceeds to block 130. In block 130, a number of conditions are checked. If the existing record's delete flag is true and the updated record override SMS flag is true, and the updated record and existing record timestamps are closer than the conflict time window or the updated record timestamp is earlier than the existing record timestamp, then the updated record's delete flag is set to false, as shown in block 132. The process, reset updated record conflict information 150, is called in block 134, and the execution proceeds to block 116.

On the other hand, if the condition checked in block 130 was false, then the updated record wins conflict process 162 is executed, as shown in block 144. If the value returned by process 162 was false, then the reset updated record conflict information process is called in block 148 and the process returns to block 116. Otherwise, the SMS update data is copied to the updated record data, as shown in block 146, and then the existing record is replaced by the updated record.

To further illustrate the operations of the present invention, a number of examples are described below while referring to FIG. 8.

In the first example, the SMS updates a record at SCP nodes 201, 202 and 203 first and then SCP 201 updates the same record within the conflict time window. At SCP 201 (SCP1), the SCP update is applied by the request handler because SCP1 is the node of origination. When the SCP1 update is propagated to SCP2 and SCP3, the update will be ignored because the existing record was updated by an SMS update request, which has higher priority. However, if the override SMS flag is true in the SCP1 update request, the SCP1 update would be used to update the existing records in SCP2 and SCP3. The SMS update can also be overridden if the operational priority flag is true in the SCP1 update request.

In the second example, a replacement type of update originated at SCP1 is applied at the source and propagated and applied to the other SCP nodes. An SMS update request with an earlier timestamp then arrives at each SCP. The late arrival of the SMS update request may be due to a downed path or other error conditions in the networks. In the present invention, the existing record wins the conflict because of the older timestamp of the SMS update.

In a third example, two update requests originate from two different SCPs at nearly the same time (within the conflict time window), such as one from SCP1 and one from SCP3. The data records in SCP1 is updated with the SCP1 update request, and the data records in SCP3 is updated with the SCP3 update request. When the two requests are propagated to the other SCPs in the network, the priority level of the two SCPs are compared. If SCP1 is configured to have higher priority than SCP3, the updated record generated at SCP1 will replace the existing record at SCP2 and SCP3, but the update generated at SCP3 will be ignored at SCP1 and SCP2. Therefore, all the databases will contain the same data. In the same scenario, the update originating at a SCP can also override the updates generated at other SCPs if its service operational priority level is higher than the others. Recall that the priorities are organized by: operational priority>override SMS flag>SMS>SCP order. So, if in the above scenario the SCP3 update has a higher operational priority, then the SCP3 update trumps the SCP1 update, because SCP order is lower ranked than operational priority. However, if both update requests are preferred due to the operational priority, then SCP1's higher order allows the update originating therefrom to override the other update request.

In another example, if a preferred (operational priority) update requests arrives at an SCP that has an older timestamp than the existing record that was updated by an SCP update, the preferred update is ignored because of its older timestamp. However, if the existing record was updated by an SMS update request, the SCP update will be ignored because the SMS record cannot be replaced by a preferred update of an earlier timestamp.

In another example, if an SMS update first inserts a data record at all the SCPs, then update requests originating at more than one SCP requests to replace the same data record. Because of a path delay or down time, the SMS insert update request arrives after the SCP requests at a particular node. Therefore, at that node, the SCP update request pertains to a record that doesn't yet exist in the database. The present invention provides for the insertion of the data record by the SCP update with a delete flag set. The late arriving SMS update then resets the delete flag at that record but does not change its data contents.

It may be seen that with the conflict resolution methodology of the present invention, the database data contents can be synchronized despite out-of-order update request delivery and nearly simultaneous update requests. In summary, if the timestamps between the existing record and the updated record is less than or equal to the conflict time window, then the priority of updates is: operational priority>override SMS>SMS>SP order. If the existing record timestamp is older and the difference between the timestamps is greater than the conflict time window, then the update request will be carried out and the version number of the record is incremented by one. If the existing record timestamp is newer and the difference between the timestamps is greater than the conflict time window, the update request is ignored, but the version number of the existing record is incremented by one. Furthermore, by the use of operational priority flag, override SMS flag, delete flag, and insert flag, conflict resolution resulting from delayed delivery of update requests or out-of-order update requests can be resolved so that all the SCPs in the network maintain the same copy of data.

While the invention has been particularly shown and described by the foregoing detailed description, it will be understood by those skilled in the art that various changes, alterations, modifications, mutations and derivations in form and detail may be made without departing from the spirit and scope of the invention.

What is claimed is:

1. A method of maintaining synchronization among at least two databases, comprising:

receiving a data update request for a data record at a database;

comparing a timestamp of the data record to a timestamp of the data update request;

comparing an operational priority of the data record to the operational priority of the data update request in response to the timestamp of the data update request being substantially identical to the timestamp of the data record;

updating the data in the data record with the data update request in response to the operational priority of the data update request being higher than the operational priority of the data record;

comparing a node priority of the data record to a node priority of the data update request in response to the timestamp of the data update request being substantially identical to the timestamp of the data record and the operational priority of the data update request being substantially identical to the operational priority of the data record; and updating the data in the data record with data associated with the data update request in response to the node priority of the data update request being higher than the node priority of the data record.

2. The method, as set forth in claim 1, wherein comparing the timestamps of the data update request and the data record comprises determining whether a difference between the timestamps is greater than a predetermined conflict time window.

3. The method, as set forth in claim 1, wherein comparing the node priority comprises determining whether the node priority of the update request is a service management system priority level and making the update with the update request in response to the node priority being service management system.

4. The method, as set forth in claim 1, further comprising:
preparing an updated data record in response to the update data request; and
setting an override SMS flag of the updated data record to true in response to the data record node priority being service management system priority level.

5. The method, as set forth in claim 1, further comprising:
preparing an updated data record corresponding to the data update request in response to not locating the data record in the database pertaining to the update data request; and
inserting the updated data record in the database.

6. The method, as set forth in claim 1, further comprising:
preparing an updated data record corresponding to the data update request in response to not locating the data record in the database pertaining to the update data request;
setting a delete flag of the updated record to true; and
inserting the updated data record in the database.

7. The method, as set forth in claim 6, further comprising resetting the delete flag of the inserted data record in response to a timestamp of an SMS priority update request being earlier than the timestamp of the inserted data record.

8. The method, as set forth in claim 1, further comprising:
preparing an updated data record corresponding to the data update request by:
reading the data record into a temporary buffer;
modifying the data in the temporary buffer;
update the timestamp, version number, and node priority of the data record in the temporary buffer; and
replacing the data record in the database with the updated data record in the temporary buffer.

9. The method, as set forth in claim 1, further comprising:
comparing a version number of the data record and the data update request; and
modifying the data record in the database in response to the version number of the data update request being greater than that of the data record.

10. A method of processing data update requests originating from multiple sources at a database, comprising:
receiving a data update request associated with a data record in the database;
locating the data record in the database;
comparing a timestamp of the data record to a timestamp of the data update request;
updating the data in the data record with the data update request in response to the timestamp of the data update request being a predetermined conflict time window later than the timestamp of the data record;
comparing an operational priority of the data record to the operational priority of the data update request in response to the timestamp of the data update request being substantially identical to the timestamp of the data record;
updating the data in the data record with the data update request in response to the operational priority of the data update request being higher than the operational priority of the data record;
comparing a node priority of the data record to the node priority of the data update request in response to the timestamp of the data update request being substantially identical to the timestamp of the data record and the operational priority of the data update request being substantially identical to the operational priority of the data record;
updating the data in the data record with the data update request in response to the node priority of the data update request being higher than the node priority of the data record; and
ignoring the data update request in response to the timestamp of the data update request being substantially identical to the timestamp of the data record, the operational priority of the data update request being substantially identical to the operational priority of the data record, and the node priority of the data update request being substantially identical to the node priority of the data record.

11. The method, as set forth in claim 10, wherein comparing the node priority comprises determining whether the node priority of the update request is a service management system priority level and making the update with the update request in response to the node priority being service management system.

12. The method, as set forth in claim 10, further comprising:
preparing an updated data record in response to the update data request; and
setting an override SMS flag of the updated data record to true in response to the data record node priority being service management system priority level.

13. The method, as set forth in claim 10, further comprising:
preparing an updated data record corresponding to the data update request in response to not locating the data record in the database pertaining to the update data request; and
inserting the updated data record in the database.

14. The method, as set forth in claim 10, further comprising:
preparing an updated data record corresponding to the data update request in response to not locating the data record in the database pertaining to the update data request;
setting a delete flag of the updated record to true; and
inserting the updated data record in the database.

15. The method, as set forth in claim 14, further comprising resetting the delete flag of the inserted data record in response to a timestamp of an SMS priority update request being earlier than the timestamp of the inserted data record.

16. The method, as set forth in claim 10, further comprising:
preparing an updated data record corresponding to the data update request by:
reading the data record into a temporary buffer;
modifying the data in the temporary buffer;
update the timestamp, version number, and node priority of the data record in the temporary buffer; and replacing the data record in the database with the updated data record in the temporary buffer.

17. The method, as set forth in claim 10, further comprising:
comparing a version number of the data record and the data update request; and
modifying the data record in the database in response to the version number of the data update request being greater than that of the data record.

18. The method, as set forth in claim 15, further comprising deleting data records in the database having a true delete flag.

19. A method of handling data update requests for a database, comprising:
receiving a data update request for a data record in the database;
comparing a version number of the data record to a version number of the data update request;
resolving update conflict in response to the version number of the data update request being less than or equal to that of the data record, comprising:
comparing a timestamp of the data record to a timestamp of the data update request;
updating the data in the data record with the data update request in response to the timestamp of the data update request being a predetermined conflict time window later than the timestamp of the data record;
comparing an operational priority of the data record to the operational priority of the data update request in response to the timestamp of the data update request being substantially identical to the timestamp of the data record;
updating the data in the data record with the data update request in response to the operational priority of the data update request being higher than the operational priority of the data record;
comparing a node priority of the data record to the node priority of the data update request in response to the timestamp of the data update request being substantially identical to the timestamp of the data record and the operational priority of the data update request being substantially identical to the operational priority of the data record;
updating the data in the data record with the data update request in response to the node priority of the data update request being higher than the node priority of the data record; and
ignoring the data update request in response to the timestamp of the data update request being substantially identical to the timestamp of the data record, the operational priority of the data update request being substantially identical to the operational priority of the data record, and the node priority of the data update request being substantially identical to the node priority of the data record.

20. The method, as set forth in claim 19, wherein comparing the node priority comprises determining whether the node priority of the update request is a service management system priority level and making the update with the update request in response to the node priority being service management system.

21. The method, as set forth in claim 19, further comprising:
preparing an updated data record in response to the update data request; and
setting an override SMS flag of the updated data record to true in response to the data record node priority being service management system priority level.

22. The method, as set forth in claim 19, further comprising:
preparing an updated data record corresponding to the data update request in response to not locating the data record in the database pertaining to the update data request; and
inserting the updated data record in the database.

23. The method, as set forth in claim 19, further comprising:
preparing an updated data record corresponding to the data update request in response to not locating the data record in the database pertaining to the update data request;
setting a delete flag of the updated record to true; and
inserting the updated data record in the database.

24. The method, as set forth in claim 23, further comprising resetting the delete flag of the inserted data record in response to a timestamp of an SMS priority update request being earlier than the timestamp of the inserted data record.

25. The method, as set forth in claim 19, further comprising:
preparing an updated data record corresponding to the data update request by:
reading the data record into a temporary buffer;
modifying the data in the temporary buffer;
update the timestamp, version number, and node priority of the data record in the temporary buffer; and
replacing the data record in the database with the updated data record in the temporary buffer.

26. The method, as set forth in claim 19, further comprising:
comparing a version number of the data record and the data update request; and
modifying the data record in the database in response to the version number of the data update request being greater than that of the data record.

27. The method, as set forth in claim 26, further comprising periodically deleting data records in the database having a true delete flag.

28. A database system, comprising:
a data update request having a data update and a timestamp, an operational priority, and a node priority associated with the data update; and
a database operable to receive the data update request, update data in a data record associated with the data update request in response to the timestamp of the data update request being substantially greater than a timestamp stored in the data record, update data in the data record in response to the operational priority of the data update request being higher than an operational priority stored in the data record, or update data in the data record in response to the node priority of the data update request being higher than a node priority stored in the data record.

29. The database system, as set forth in claim 28, wherein the database is operable to determine whether a difference between the timestamps is greater than a predetermined conflict time window.

30. The database system, as set forth in claim 28, wherein the database is operable to determine whether the node priority of the data update request is a service management system priority level and update the data in response to the node priority being service management system priority level.

31. The database system, as set forth in claim 30, wherein the database is operable to prepare an updated data record in response to the update data request, and set an override SMS flag of the updated data record to true in response to the data record node priority being service management system priority level.

32. The database system, as set forth in claim 28, wherein the database is operable to prepare an updated data record corresponding to the data update request in response to not locating the data record in the database pertaining to the update data request, and insert the updated data record in the database.

33. The database system, as set forth in claim 28, wherein the database is operable to prepare an updated data record corresponding to the data update request in response to not locating the data record in the database pertaining to the update data request, set a delete flag of the updated record to true, and insert the updated data record in the database.

34. The database system, as set forth in claim 33, wherein the database is operable to reset the delete flag of the inserted data record in response to a timestamp of an SMS priority update request being earlier than the timestamp of the inserted data record.

35. The database system, as set forth in claim 28, wherein the database is operable to prepare an updated data record corresponding to the data update request by reading the data record into a temporary buffer, modifying the data in the temporary buffer, update the timestamp, version number, and node priority of the data record in the temporary buffer, and replacing the data record in the database with the updated data record in the temporary buffer.

36. The database system, as set forth in claim 28, wherein the database is operable to compare a version number of the data record and the data update request, and modify the data record in the database in response to the version number of the data update request being greater than that of the data record.

37. A computer program embodied on a computer-readable medium for maintaining synchronization among multiple identical databases, the computer program being operable to:

receive a data update request for a data record at a database;

compare a timestamp of the data record to a timestamp of the data update request;

update data in the data record with data associated with the data update request in response to the timestamp of the data update request being greater than the timestamp of the data record;

compare an operational priority of the data record to the operational priority of the data update request in response to the timestamp of the data update request being substantially identical to the timestamp of the data record;

update the data in the data record with the data update request in response to the operational priority of the data update request being higher than the operational priority of the data record;

compare a node priority of the data record to a node priority of the data update request in response to the timestamp of the data update request being substantially identical to the timestamp of the data record and the operational priority of the data update request being substantially identical to the operational priority of the data record; and update the data in the data record with the data update request in response to the node priority of the data update request being higher than the node priority of the data record.

38. The computer program, as set forth in claim 37, wherein the computer program determines whether a difference between the timestamps is greater than a predetermined conflict time window.

39. The computer program, as set forth in claim 38, wherein the computer program determines whether the node priority of the update request is a service management system priority level and making the update with the update request in response to the node priority being service management system.

40. The computer program, as set forth in claim 37, wherein the computer program is further operable to:

prepare an updated data record in response to the update data request; and set an override SMS flag of the updated data record to true in response to the data record node priority being service management system priority level.

41. The computer program, as set forth in claim 37, wherein the computer program is further operable to:

prepare an updated data record corresponding to the data update request in response to not locating the data record in the database pertaining to the update data request; and insert the updated data record in the database.

42. The computer program, as set forth in claim 37, wherein the computer program is further operable to:

prepare an updated data record corresponding to the data update request in response to not locating the data record in the database pertaining to the update data request;

set a delete flag of the updated record to true; and insert the updated data record in the database.

43. The computer program, as set forth in claim 42, wherein the computer program is further operable to reset the delete flag of the inserted data record in response to a timestamp of an SMS priority update request being earlier than the timestamp of the inserted data record.

44. The computer program, as set forth in claim 37, wherein the computer program is further operable to prepare an updated data record corresponding to the data update request by reading the data record into a temporary buffer, modifying the data in the temporary buffer, updating the timestamp, version number, and node priority of the data record in the temporary buffer, and replacing the data record in the database with the updated data record in the temporary buffer.

45. The computer program, as set forth in claim 37, wherein the computer program is further operable to:

compare a version number of the data record and the data update request; and modify the data record in the database in response to the version number of the data update request being greater than that of the data record.

* * * * *